United States Patent [19]

Fujii et al.

[11] 4,268,841

[45] May 19, 1981

[54] IMAGE RECORDING METHOD AND APPARATUS THEREFOR

[75] Inventors: Motoharu Fujii, Tokyo; Noboru Koumura, Narashino; Naoki Ayata, Yokohama; Yasushi Sato, Kawasaki, all of Japan

[73] Assignee: Canon Kabushiki Kaisha, Tokyo, Japan

[21] Appl. No.: 53,089

[22] Filed: Jun. 28, 1979

[51] Int. Cl.³ .................. G01D 15/24; B65H 5/02
[52] U.S. Cl. .................. 346/138; 271/276; 271/301
[58] Field of Search ............ 346/138, 1; 271/196, 271/276, 301

[56] References Cited

U.S. PATENT DOCUMENTS

| | | | |
|---|---|---|---|
| 3,363,520 | 1/1968 | Obenshain | 271/276 X |
| 3,609,724 | 9/1971 | Allison et al. | 271/196 X |
| 3,828,355 | 8/1974 | Wick et al. | 346/138 X |
| 4,157,178 | 6/1979 | Ollendick | 346/138 X |

Primary Examiner—George H. Miller, Jr.
Attorney, Agent, or Firm—Fitzpatrick, Cella, Harper & Scinto

[57] ABSTRACT

A recording medium is directed onto a cyclically moving support cylinder and information is recorded on the recording medium as it is sucked onto the support cylinder, whereafter upon termination of the recording, the suction force is controlled to permit the recording medium to be discharged out of the circulatory moving path of the support cylinder.

5 Claims, 7 Drawing Figures

IMAGE RECORDING METHOD AND APPARATUS THEREFOR

BACKGROUND OF THE INVENTION

1. Field of the Invention

This invention relates to an image recording method of forming an image on a recording medium and an apparatus therefor, and more particularly to an image recording method which can record information on a recording medium at high speed and an apparatus therefor.

2. Description of the Prior Art

Heretofore, recording information on a recording medium by a facsimile receiver or an ink jet printer or the like has been effected by mounting a recording medium on a supporting drum having a gripper pawl or the like, then recording information on the recording medium, and removing the recording medium from the supporting drum, to thereby obtain a record.

Such an image recording system whereby recording is effected with a recording medium supported on a drum enables a number of scans to be effected on the recording medium by rotation of the drum, and this is a very excellent system which can accomplish highly dense information representation by a small number of recording elements.

However, in the prior art system, time has been unavoidably required to mount the recording medium on the drum and remove the recording medium therefrom.

Also, the rising time until the supporting drum with the recording medium mounted thereon is brought to its constant speed state for the information recording and the fulling time for separating the recording medium from the supporting drum have been unavoidable.

These times not only have elongated the recording time per sheet of recording medium, but also such waiting times have been inneglible when information recording is to be effected continuously on a number of sheets of recording medium.

Moreover, in an apparatus for carrying out such a system, a supporting mechanism such as gripper pawl or the like has been required on the supporting drum and a control mechanism therefor has also been required, thus complicating the apparatus.

The supporting drum, which has thereon an accessory mechanism such as gripper pawl or the like, has unavoidably added to its weight and, since the supporting drum having such an accessory mechanism is driven from its rest or low speed condition to its high speed condition at each recording cycle, the wear of various parts of the apparatus has been so remarkable that frequent check-up and maintenance have been unavoidable.

SUMMARY OF THE INVENTION

The present invention has been made in view of the above-noted points. It is an object of the present invention to provide an image recording method and an apparatus therefor which reduce the waiting time involved for recording information on the recording medium.

It is a further object of the present invention to provide an image recording method and an apparatus therefor which can record information at high speed by a simple construction.

According to the present invention, a recording medium is directed onto a cyclically moving support and information is recorded on the recording medium as it is sucked onto the support, whereafter upon termination of the recording, the suction force is controlled to permit the recording medium to be discharged out of the circulatory moving path of the support.

Thus, the present invention can immediately accelerate a supplied recording medium to the recording speed and can therefore minimize the rising time and accordingly enables recording with a lesser waiting time.

Also, it is unnecessary to change the speed of the recording medium support to discharge the recording medium after termination of the recording, thus enabling high-speed continuous recording.

Further, the present invention requires no mechanical engagement and thus eliminates the possibility of injuring the recording medium and enables image recording of high quality to be achieved.

The invention will become more fully apparent from the following detailed description thereof taken in conjunction with the accompanying drawings.

DESCRIPTION OF THE PREFERRED EMBODIMENTS

Figure 1:
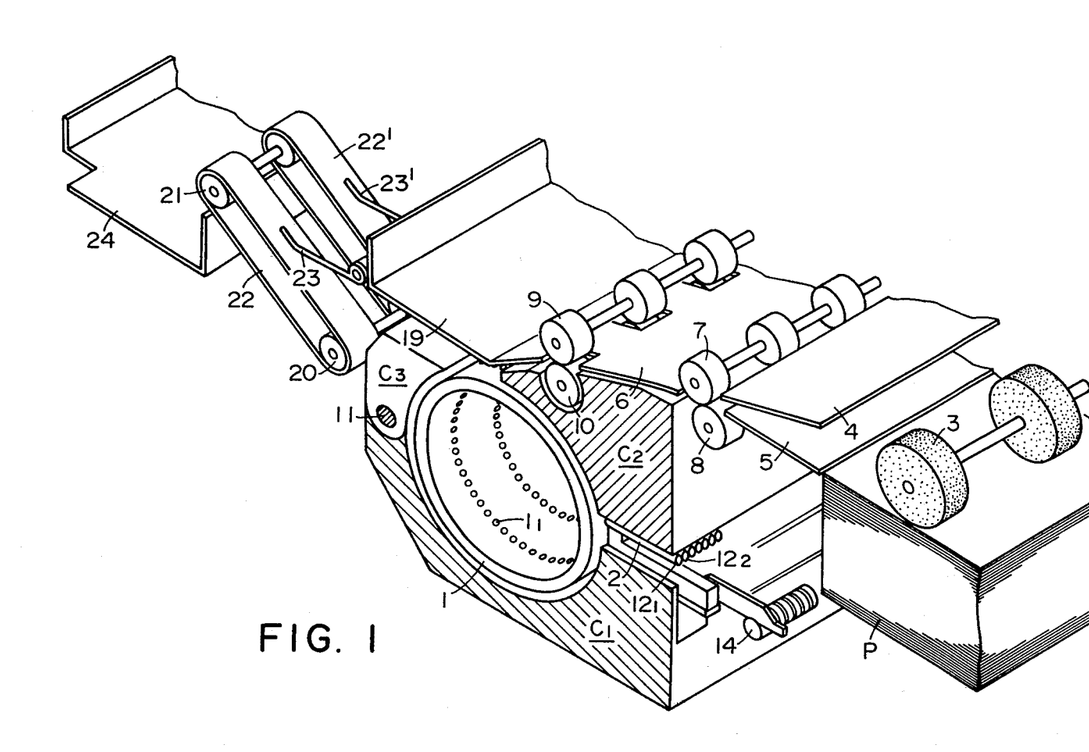
FIG. 1 is a perspective view of a specific example of the image recording apparatus according to the present invention.
Figure 2:
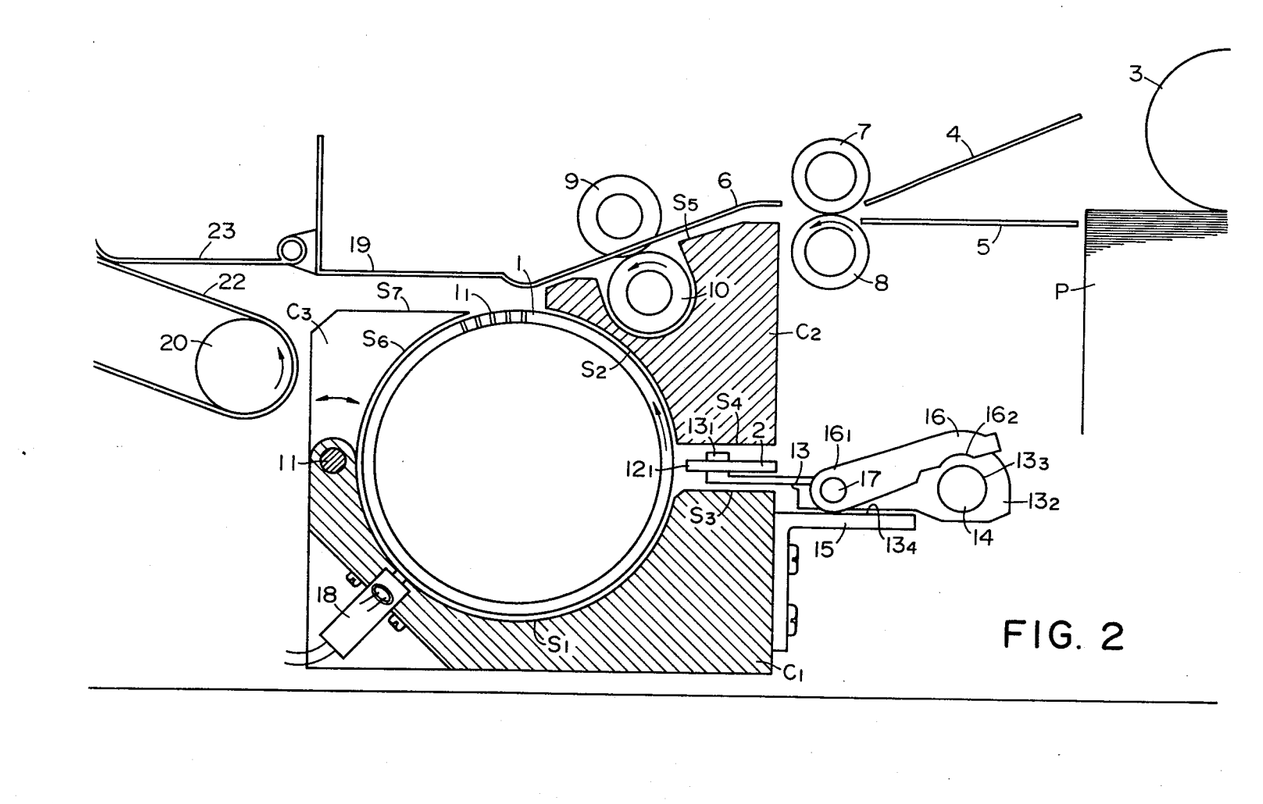
FIG. 2 is a side cross-sectional view of the apparatus of FIG. 1.

FIG. 1 is a perspective view of a specific embodiment of the image recording apparatus according to the present invention, and FIG. 2 is a side cross-sectional view thereof.

Designated by $C_1$ is a lower casing block having a recess for movably holding a rotatable cylinder substantially centrally thereof. The recess is in the form of an arcuate surface $S_1$.

Denoted by 1 is a recording medium supporting member which is in the form of a hollow support cylinder. The support cylinder 1 is disposed on the recess of the lower casing block $C_1$.

Designated by $1_1$ are suction holes extending through the wall of the support cylinder 1 and connecting the outer peripheral surface of the cylinder to the hollow portion of the cylinder. On the surface of the support cylinder 1, a plurality of rows of suction holes are provided at predetermined minute intervals along the direction of rotation of the cylinder. The air within the support cylinder 1 is sucked and exhausted by suction means, not shown.

$C_2$ is an upper casing block disposed so that the left-hand side surface $S_2$ thereof covers the right upper half portion of the support cylinder 1. The upper casing block $C_2$ has the lower surface $S_4$ thereof overlying the right upper surface $S_3$ of the lower casing block $C_1$ at a predetermined interval. By these two surfaces $S_3$ and $S_4$, there is formed a slit-like window for a recording head 2 (which will later be described fully) for recording information on a recording medium supported on the support cylinder 1.

Designated by P are recording mediums stored in a supply station. A feed roller 3 for feeding the recording mediums P is located on the recording mediums stored in the supply station.

A transport path for feeding the recording mediums from the supply station to the support cylinder is formed by guide plates 4, 5, 6 and the upper surface $S_5$ of the upper casing block $C_2$.

In the transport path, there is disposed a plurality of sets of guide rollers 7, 8, 9 and 10.

Designated by $C_3$ is a movable casing block attached to the left upper portion of the lower casing block $C_1$. The movable casing block $C_3$ is pivotably supported by a pin 11 and, as will later be described fully, the pivotal movement thereof is suitably controlled during the ingress and egress of the recording medium. The right-hand side surface $S_6$ of the block $C_3$ is disposed so as to cover substantially the left upper half of the support cylinder 1.

Thus, over the surface of the support cylinder 1, there is formed a circulatory moving path space for recording medium substantially covered by the side surfaces of the blocks. In the circulatory moving path space, the gap between the surfaces $S_1$ and $S_2$ is provided as the information recording window and the gap between the surfaces $S_2$ and $S_6$ is provided as the recording medium supply and outlet port, and these gaps also serve as the air communicating path leading to the external portion and the circulatory moving path. A recording medium may be fed from the recording medium supply and outlet port into the circulatory moving path and sucked onto the support cylinder 1 to permit information to be recorded thereon.

The recording of the information onto the recording medium is effected by a recording head 2 disposed in the information recording window. The shown recording head 2 is provided with a plurality of ink jet nozzles $12_1, 12_2, \ldots$, and in the shown example, sixteen nozzles $12_1, \ldots, 12_{16}$. From these ink jet nozzles, image recording of resolution 8 dots/mm may be effected by a control mechanism which will later be described fully. These sixteen ink jet nozzles $12_1, \ldots, 12_{16}$ are integrally formed as the recording head 2. The ink jet nozzles $12_1$ are axially arranged in a row to form the recording head 2.

The recording head may be provided not only by a single row of ink jet nozzles but also by two or three rows of ink jet nozzles.

Further, the recording head may of course be of any desired construction in accordance with the control mechanism for each nozzle.

Such recording head 2 is secured to one end $13_1$ of a head supporting arm 13. The head supporting arm 13 is movably supported to enable the scanning and recording to be accomplished by the recording head 2.

A head driving shaft 14 threaded at a predetermined pitch is located outside the slit-like information recording window and substantially parallel to the axis of rotation of the aforementioned support cylinder 1. On the other hand, a hole $13_3$ having an inside diameter sufficient to effect free rotation of the head driving shaft 14 is provided at the end $13_2$ of the head supporting arm 13 which is opposite to the end $13_1$ whereat the head is attached, and the head driving shaft 14 is passed through the hole $13_3$. Also, the central lower portion $13_4$ of the head supporting arm 13 is supported by an angle member 15 attached to the lower casing block $C_1$. It is particularly effective for the supporting portion to keep smoothness and provide good scanning movement of the head supporting arm 13.

A drive engaging arm 16 engaging the head driving shaft 14 has one end $16_1$ thereof pivotally mounted on the head supporting arm 13 by means of a pin 17, and a threaded groove $16_2$ of a pitch equal to the pitch of the thread on the head driving shaft 14 is provided at the end of the drive engaging arm which is opposite from the end $16_1$, so that the threaded groove $16_2$ completely meshes with the head driving shaft 14 in the engaging position. Thus, rotation of the head driving shaft 14 in a predetermined direction causes the head supporting arm 13 integrally coupled to the drive engaging arm 16 to be moved in a direction corresponding to the direction of rotation of the shaft 14 and parallel to the axis of rotation of the support cylinder 1 which supports the recording medium. The recording head 2 attached to the end $13_1$ of the head supporting arm may scan the recording medium on the support cylinder 1 to accomplish the recording.

Designated by 18 is recording medium end detecting means provided on the surface $S_1$ which is one of the partition surfaces for the circulatory moving path leading from the recording medium supply and outlet port to the information recording window.

The recording medium end detecting means 18 may detect the leading end the trailing end of the recording medium on the support cylinder 1 and the detection signals may be utilized as the control signals for controlling the initiation and termination of the image recording.

The recording medium end detecting means 18 may be, for example, a photodetector device which may detect any variation in reflection factor of the recording medium and the support cylinder therefor. Such photodetector device is usually known as a photoswitch which comprises a combination of a light-emitting diode and a phototransistor. The rise and fall of the variation in the reflection factor detected by the phototransistor are utilized as the control signals.

Of course, the recording medium end detecting means is not limited to the above-described photodetector device but one of various photodetector devices or other electrical or mechanical detector means may also be utilized.

The recording medium sucked onto the support cylinder 1 and having information recorded thereon is outwardly discharged through the circulatory moving path and via the recording medium supply and outlet port. The discharge of such recording medium, as will later be described, by suddenly stopping the sucking operation of the support cylinder 1.

Further, it is effective to use therewith an interference action to the circulatory moving path of the movable casing block $C_3$.

That is, the movable casing block $C_3$ is pivotable about the pin 11 as previously mentioned and it is normally maintained so that the support cylinder 1 surface and the side surface $S_6$ of the block $C_3$ keep a suitable clearance for transporting of the recording medium. On the other hand, in the case of the paper discharging operation, the side surface $S_6$ is brought closer to the cylinder 1 surface by the action of a solenoid on the like, not shown, to thereby narrow the circulatory moving path and block further circulation. The edge formed by the side surface $S_6$ and the upper surface $S_7$ of the block $C_3$ interferes with the circulatory moving path to completely separate the recording medium floating on the support cylinder 1 surface due to a reduction or stoppage of the suction force. Moreover, since the recording medium is subjected to the conveying force of the rotating support cylinder 1, it is forced out from the separating edge along the upper surface $S_7$ of the block $C_3$ and can be completely discharged from the recording medium supply and outlet port.

It is also possible to cause the floating recording medium to ride on the separating edge by suitably selecting the rotational speed of the support cylinder 1, the reduction rate of the suction force, etc., instead of positively directing the separating edge to the interfering position. In this case, there is necessarily a merit that no drive for the separation is required and the apparatus can be simplified.

On the other hand, it is effective for the movable casing block $C_3$ to be operated not only during the discharge of the recording medium but also during the feeding thereof. That is, the ingress of the recording medium is facilitated by spacing the side surface $S_6$ of the movable block $C_3$ apart from the support cylinder 1 surface during the ingress of the recording medium into the circulatory moving path. By so widening the gap, the possibility of the recording medium being jammed during the ingress thereof may be eliminated. It is particularly effective when the self-support of the recording medium is strong.

Also, if the rotational speed of the support cylinder is increased with respect to the speed of ingress of the recording medium fed by the supply roller, the possibility of jamming may be minimized even if there is no operation of the movable block. However, it is a matter of course that a better result can be obtained if the cooperative operation of the movable block is incorporated as described above.

In the manner previously described, the casing discharge path for directing the recording medium discharged through the recording medium supply and outlet port is formed by the upper surface $S_7$ of the movable block and the guide plate 19. In connection to that casing discharge path, there is provided a conveyor belt 22 passed over and between a pair of rollers 20 and 21. In the shown apparatus, the conveyor belt 22 is disposed so that the upper surface of the belt so passed is upwardly inclined. This is effective to diminish the speed of the recording medium when the recording medium separated from the support cylinder 1 which is rotating at high speed jumps out of the casing discharge path at high speed. A keep member 23 is disposed on the conveyor belt 22 to prevent floating of the recording medium.

The roller 20 or 21 is driven by a drive source, not shown, to move the conveyor belt 22 at a predetermined speed.

Thus, the recording medium is reduced in speed and discharged into a discharged paper tray 24 provided adjacent to the conveyor belt 22.

Figure 3:
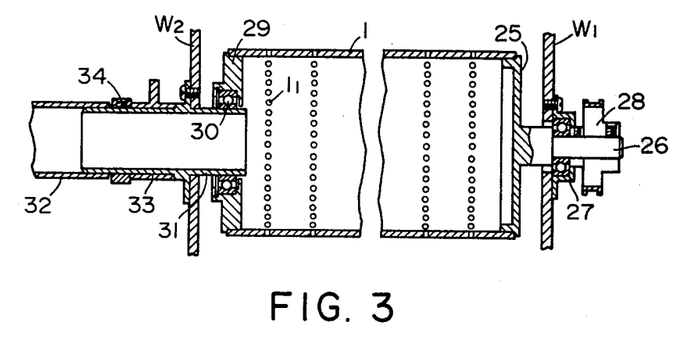
FIG. 3 is a cross-sectional view taken along a plane containing the rotational axis of the support cylinder.

FIG. 3 shows a cross-section of the support cylinder 1 taken along a plane containing the axis of rotation thereof.

The support cylinder 1 is journalled to and between a pair of side plates $W_1$ and $W_2$ attached to the side edges of the aforementioned casing blocks.

On the right-hand side of the support cylinder 1, a disc 25 is fitted to the end of the support cylinder 1 in an air-tight fashion and a support shaft 26 provided on the disc 25 is journalled by means of a bearing 27 secured onto the side plate $W_1$. A drive pulley 28 is secured at the end of the support shaft 26, and a belt for transmitting the drive force from an unshown drive source is passed over the pulley 28 to provide the rotational force of the support culinder 1.

On the left-hand side of the support cylinder 1, a disc 29 is fitted to the end of the cylinder 1. In the center portion of the disc 29, a vent hole is formed concentrically with the disc for providing a suction from the suction hole of the cylinder surface, and a bearing 30 is fitted around the vent hole. A vent tube 31 secured to the side plate $W_2$ is connected to the vent hole on the disc 29 and the outer periphery thereof is engaged with the bearing 30. Thus, the vent tube 31 provides the rotational axis of the support cylinder 1. It is important to keep good air-tightness between the connecting portions on the left-hand side of the support cylinder 1, and it will be effective to attach various seal members to the connecting portions.

The vent tube 31 is also projected outwardly on the left-hand side of the side plate $W_2$ and is connected to a hose 32 which in turn is connected to a suction motor, not shown. In an intermediate portion of the vent tube, an opening $31_1$ is formed which communicates the interior of the tube with the exterior of the tube.

A control valve 33 is provided in the portion of the opening $31_1$ to open and close the opening $31_1$. The shown control valve 33 comprises a belt-like member having a sufficient inside diameter to rotate in intimate contact with the outer periphery of the vent tube 31, and an opening $33_1$ equal in diameter to the opening $31_1$ and provided in the surface of the belt-like member. Designated by 34 is a collar member secured to the outer periphery of the vent tube and preventing axial movement so that the belt-like member of the control valve 33 does not slip out.

By the control like the control of the opening and closing of the control valve which permits momentary variation in the suction force, the suction operation of the support cylinder 1 may be controlled with very good response characteristic.

Figure 4:
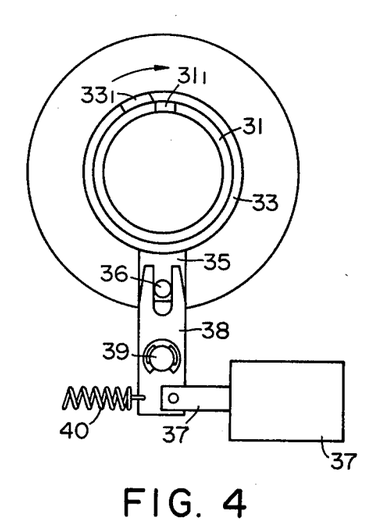
FIG. 4 is a cross-sectional view of the control valve portion shown in FIG. 3.

FIG. 4 shows a cross-section of the attached portion of the control valve 33 and illustrates an example of the accessory mechanism and the control thereof.

As already described, the control valve 33 provided on the outer periphery of the vent tube 31 has secured thereto a projected arm 35 for controlling the pivotal movement and an engaging pin 36 is studded on the end of the projected arm 35.

A plunger 37 is provided as the opening-closing drive source for the control valve $33_1$ and a transmission arm 38 for transmitting the drive force of the plunger is supported by a pin 39 and is connected at one end to the driving rod $37_1$ of the plunger 37 and is engaged at the other end with the engaging pin 36.

A coil spring 40 is retained on the end of the transmission arm 38 which is connected to the driving rod $37_1$, so as to impart a tension in the direction opposite to the direction of drive of the driving rod $37_1$.

In the apparatus of the above-described construction, during the deenergization of the plunger 37, the opening $33_1$ of the control valve 33 is deviated from the position of the opening $31_1$ of the vent tube 31, as shown, so that the vent tube 31 maintains the suction operation of the support cylinder.

When the plunger 37 is energized, the driving rod $37_1$ is moved rightwardly against the tension of the coil spring 40, so that the transmission arm 38 connected thereto is pivoted counter-clockwisely about the pin 39. The pivotal movement of the transmission arm 38 causes the engaging pin 36 to be moved leftwardly, thereby rotating the control valve 33 clockwisely. Due to the rotational movement of the control valve 33, the control valve opening $33_1$ becomes coincident with the vent tube opening $31_1$, thus opening the vent tube. Therefore, the flow of gas so far formed through the suction holes of the cylinder 1 is replenished with fresh gas through the opening in the vent tube. The flow velocity of the gas through the suction holes is remarkably reduced. Thus, the recording medium suction force of the support cylinder 1 surface is weakened.

On the other hand, when the plunger 37 is deenergized, the transmission arm 38 is moved in the opposite direction to that during the energization of the plunger by the restitution force of the coil spring, thus returning the control valve 33 to its closed condition again.

Incidentally, the control of the control valve 33 may be made effective not only by fully opening and closing the vent tube opening $31_1$, but also by opening the vent tube opening from its closed position to its intermediate position to thereby adjust the reduction in the suction force for the recording medium, or by partly closing the vent tube opening to adjust the amount of opening thereof and cause a variation in the suction force.

Description will hereinafter be made of the control of the specific example of the apparatus constructed as described above.

Figure 5:
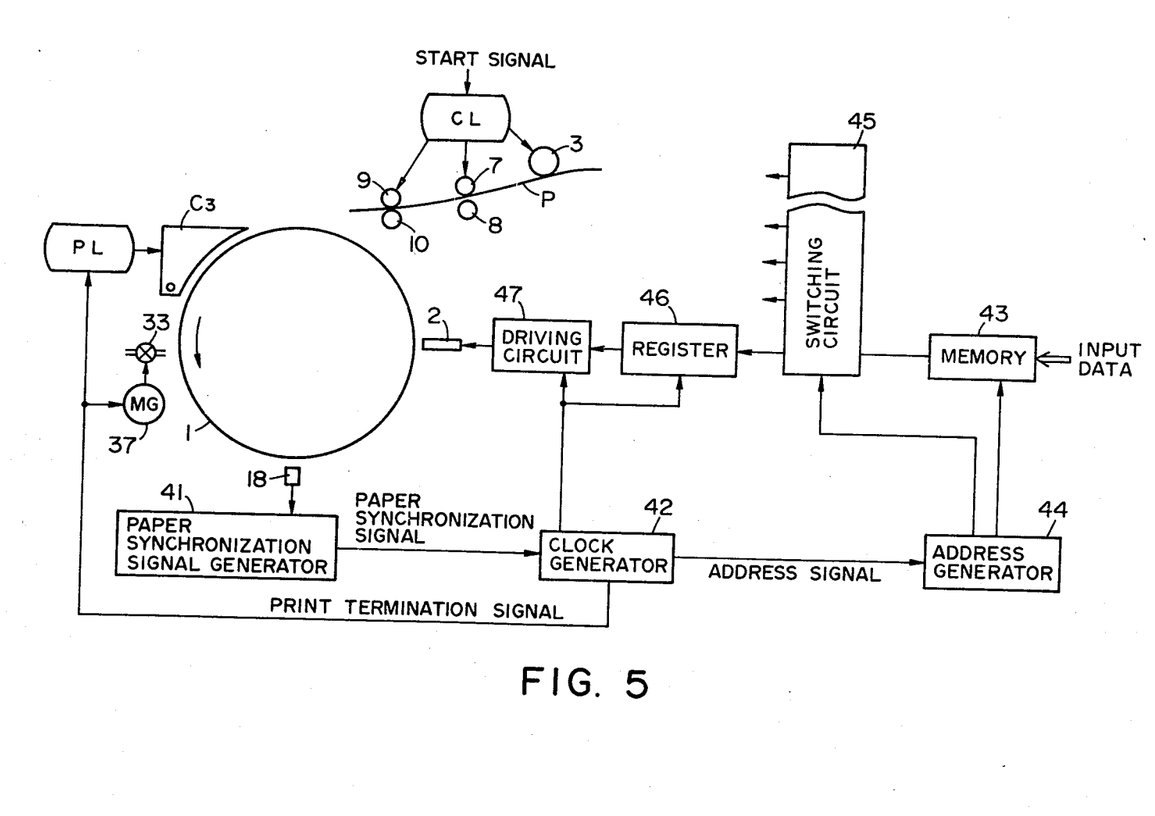
FIG. 5 is a block diagram for illustrating the image recording control of the specific example of the image recording apparatus according to the present invention.

FIG. 5 shows a block diagram of the recording control circuit and schematically illustrates the essential portions such as the support cylinder, etc., which are given similar reference numerals.

First, in response to an information recording start signal, the support cylinder 1 starts rotating. Suction means (not shown) such as suction motor which imparts a suction force to the support cylinder 1 surface also starts operating. On the other hand, the feed roller 3 of the paper feed means for applying the recording medium P to the support cylinder 1, and the guide rollers 7, 8, 9, 10, etc. are connected to an unshown drive source upon engagement of the clutch CL, thus starting to be driven.

The recording medium P fed by the paper feed means is transported into the circulatory moving path along the surface of the support cylinder 1.

At this time, the movable casing block $C_3$ is helt at a position off the interfering position so as not to interfere with the entry of the recording medium P into the circulatory moving path. It is particularly preferable to enlarge the gap between the side surface $S_6$ of the block $C_3$ and the surface of the support cylinder 1 from the position during the circulation of the recording medium, since it facilitates the entry of the recording medium. The position control of the movable casing block $C_3$ is accomplished by a plunger PL.

The leading end of the recording medium P transported into the circulatory moving path, even if the recording medium is strong in self-support, is directed along the side surface $S_6$ of the movable casing block $C_3$ and bent along the outer periphery of the support cylinder. When the entry of the recording medium P into the circulatory moving path progresses so that the recording medium comes to cover a considerable area of the support cylinder surface, the recording medium is sucked to the support cylinder 1 surface which effects suction through the suction holes. The recording medium, partly or entirely sucked to the support cylinder surface, substantially momentarily starts rotating at a velocity equal to that of the support cylinder 1. Thus, the recording medium, when sucked and retained on the support cylinder, is immediately changed over from the normal slow supply speed to the high speed for the information recording. Therefore, the velocity increasing step usually required for the change-over from the slow speed to the high speed is entirely eliminated and very sharp rising becomes possible.

Even when the supply speed is made approximate to the rotational speed of the support cylinder, the timing for delivery is not required as in the case where the recording medium is held to the support by a gripper and thus, very efficient delivery without wasteful waiting time becomes feasible.

When the leading end of the recording medium sucked and supported on the support cylinder 1 passes through the position of the recording medium end detecting means 18, this detecting means 18 generates an end detection signal. This output signal is supplied to a recording medium synchronization signal generator 44. This recording medium synchronization signal generator 41 generates a recording medium synchronization signal waveform-shaped in accordance with the detection signal.

This recording medium synchronization signal is not only used for informing of the end position of the recording medium and for providing the start timing for the information recording, but also may be utilized as a reference signal for the information recording because it is also the rotation synchronization signal of the support cylinder 1 which rotates at high speed in a predetermined condition as in the present apparatus. In order to generate the rotation synchronization signal of the support cylinder 1, it is of course possible to obtain such signal independently by utilizing pulse generating elements provided on a portion rotatable with the support cylinder 1, for example, reflectors disposed at a uniform pitch along the periphery of the support cylinder 1, or light-transmitting holes disposed at a uniform pitch on a disc provided coaxially with the support cylinder.

The signal from the recording medium synchronization signal generator 41 is supplied to a clock pulse generator 42 for generating a clock pulse which provides a reference for controlling each step of the information recording. Thus, the clock pulse generator 42 generates a clock pulse in synchronism with the recording medium synchronization signal.

On the other hand, the information to be recorded on the recording medium is stored in a memory 43 as a digitalized input data irrespective of whether the information is characters or patterns.

For a recording head 2 to effect interlace, necessary address information is selected by an address generator 44 in accordance with a predetermined rule and the selected information data is transferred through a switching circuit 45 to a predetermined register 46.

These address selection and switch selection are all based on the memory signal generated by the address generator 44 in accordance with the address signal generated by the clock pulse generator 42.

Exclusive registers 46 (46', 46'', . . . , not shown) and driving circuits 47 (47', . . . , not shown) are provided corresponding to the ink jet nozzles $12_1$, ... of the recording head 2. Therefore, in the present apparatus, there are sixteen registers and driving circuits corresponding to sixteen ink jet nozzles, but only one of them is shown.

The information data transferred to the register 46 is further supplied to the driving circuit 47 to drive the corresponding ink jet nozzle of the recording head.

All the ink jet nozzles may be driven in a similar manner.

The registers 46 (46', ... ) and the driving circuits 47(47', ... ) are all driven in accordance with the drive signal of the clock pulse generating circuit 42.

The switching circuit has its distribution number determined in accordance with the number of nozzles provided in the recording head, but where the recording head is constituted by a single ink jet nozzle, it may of course be eliminated.

Also, where the widthwise direction of the recording medium (namely, the axial direction of the support cylinder) cannot be covered at a time by the recording head as in the shown example of the apparatus, the recording head is caused to scan by the scanning mechanism as previously described. This scanning drive is also accomplished on the basis of the signal of the clock pulse generating circuit 42. Where such a scanning type recording head is employed, a driving mechanism is required but only a few nozzles may be prepared, thus simplifying the construction of the recording portion.

On the other hand, in the case of a so-called full multi-head provided with nozzles covering the widthwise direction of the recording medium, no driving mechanism is required, thus simplifying the mechanism.

Figure 6:
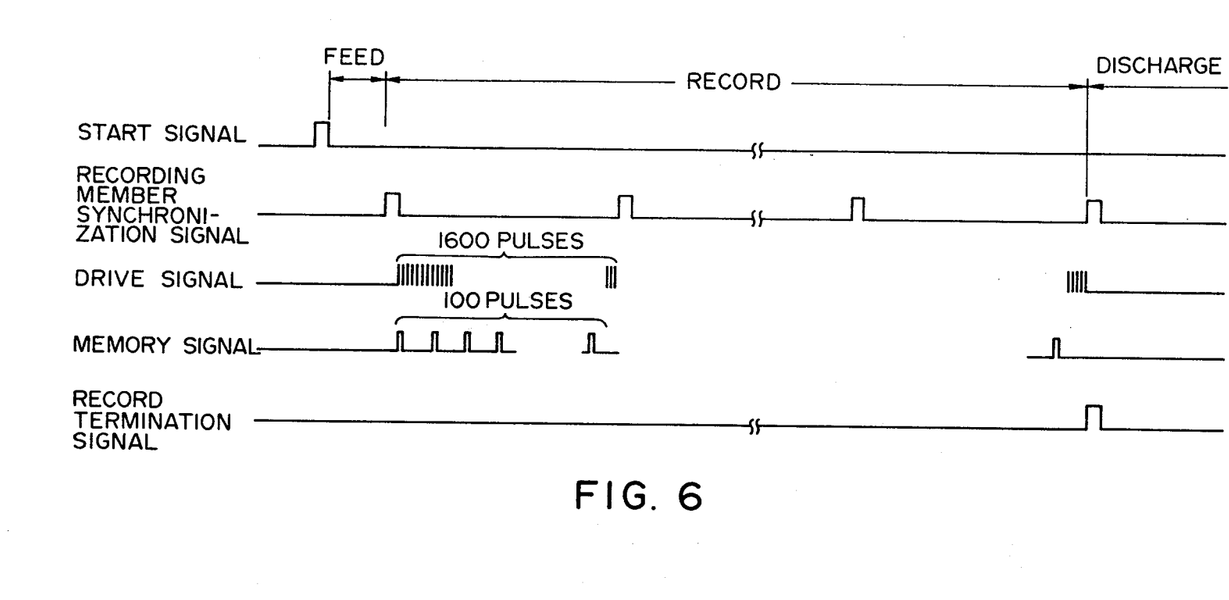
FIG. 6 is a time chart of various signals in the control shown in FIG. 5.

FIG. 6 illustrates the relationships between the various control signals. From top, the signals are start signal, recording medium synchronization signal, drive signal, memory signal and record termination signal.

One period of the recording medium synchronization signal corresponds to one full rotation of the support cylinder 1.

The resolution of the image recorded by the present apparatus is determined by the number of revolutions of the support cylinder 1 and the number of drives of the information recording head within a synchronization of rotation.

For example, in case where a sheet of recording paper of A4 size is laterally wrapped about the support cylinder with the axial direction of the support cylinder as the lengthwise direction of the recording paper and when recording is to be effected by sixteen ink jet nozzles in the direction of longitudinal width (about 300 mm), 150 full rotations are required and when recording is to be effected in the direction of lateral width (about 200 mm), use is made of a drive signal of 1600 pulses per full rotation. In this manner, it is possible to obtain a good evaluated value of resolution of about 8 dots/mm in both the longitudinal and lateral directions.

For example, by using an ink jet nozzle writing frequency of 64 KHz/sec. and 1200 rpm of the support cylinder, an image of the foregoing resolution may be formed in about 3.75 sec.

The recording medium synchronization signal is counted by the clock pulse generator 42 and when a predetermined count is read, the recorded termination signal is generated. In response to this recorded termination signal, the plunger 37 for controlling the control valve 33 shown in FIG. 5 is driven to open the control valve 33. Therefore, the recording medium so far sucked onto the support cylinder 1 floats up upon stoppage of the suction force and is expelled from the circulatory moving path. Also, at this time, in response to the record termination signal, the plunger PL moves the movable casing block $C_3$ to the circulatory moving path interfering position, and this movement of the block $C_3$ to the interfering position further ensures the separation and discharge of the recording medium.

Incidentally, the material of the support cylinder is not limited to various metals but the support cylinder may be formed of one of various synthetic resins which have a strength as a support.

Also, the surface of the support cylinder should preferably be a surface which will ensure good intimate contact. For example, the surface of the support cylinder may be a mirror-surfaced metal surface so that during circulatory movement, there is no possibility that any unsatisfactory contact portion occurs between the recording medium support cylinder and the recording medium to cause jam of the recording medium in the course of circulatory movement. The planarity of the recording medium is also maintained to ensure images of good quality to be obtained without the risk of distorting the recorded information.

It is also preferable that the surface of the cylinder be of high friction which will cause no deviation of the recording medium. For example, a rubber coating surface is suitable and its enhanced frictionality eliminates the risk of the recording medium being deviated on the support cylinder. Particularly, where the frictionality is high, the recording medium can well follow the surface of the support cylinder even if the suction force is low.

Figure 7:
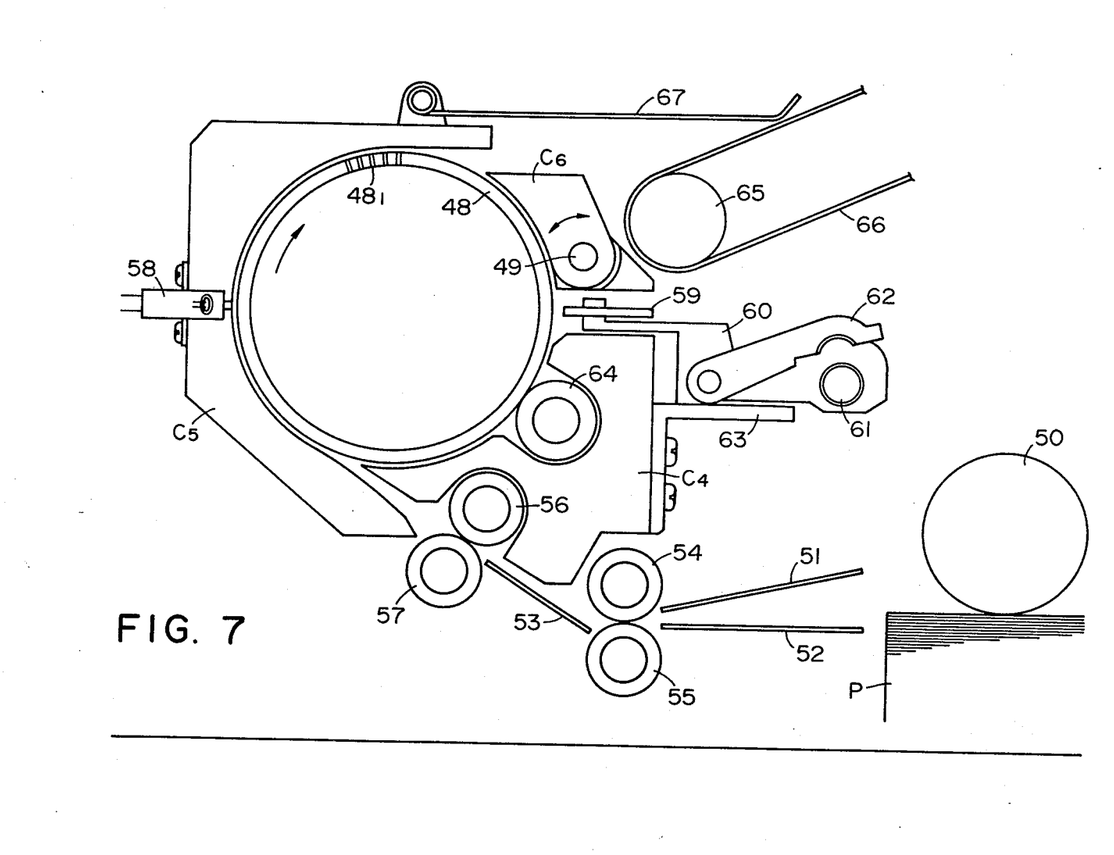
FIG. 7 is a side cross-sectional view of a modified form of the image recording apparatus according to the present invention.

FIG. 7 is a side view illustrating a further modification of the image recording apparatus according to the present invention.

In the previous example of the apparatus, a recording medium supply port of the recording medium circulatory moving path and a recording medium outlet port are provided at a common position, whereas in the present modified apparatus, a recording medium supply port and a recording medium outlet port are disposed at different positions, as at mutually opposite positions on the support cylinder.

In the present modified apparatus, those components functionally corresponding to those of the apparatus shown in FIGS. 1 and 2 are given similar names.

Designated by 48 in the present modified apparatus is a support cylinder, and designated by $48_1$ are suction holes for imparting a suction force to the surface of the support cylinder 48. The suction holes may of course select one of various arrangements, namely, may be arranged in the form of an outer grid disposed along the periphery of the support cylinder as previously mentioned, or may be arranged at random while keeping such a condition that the suction force is maintained substantially constant at whatever position the recording medium is sucked.

As has already been described, a casing is provided whose side surface is utilized to form a circulatory moving path space around the support cylinder 48. The present embodiment has a lower casing block $C_4$ providing the upper surface of the recording medium supply port and provided with an information recording window, a side casing block $C_5$ providing the lower surface of the recording medium supply port and the upper surface of the recording medium outlet port, and a movable casing block $C_6$ engaged with the lower casing block $C_4$ by means of a pin 49 so as to be able to interfere with the circulatory moving path.

A feed roller 50, guide rollers 51, 52, 53 and conveyance guide rollers 54, 55, 56, 57 are provided to supply a recording medium to the recording medium supply port formed between the lower casing block $C_4$ and the side casing block $C_5$.

A recording medium end detecting means 58 is disposed on the side casing block $C_5$. A recording head 59 is disposed in the information recording window portion of the lower casing block $C_4$.

The recording head is provided with a plurality of ink jet nozzles as already described, and is secured to a head supporting arm 60. The head supporting arm 60 has a drive engaging arm 62 so that it can be driven and scanned by a head driving shaft 61, and is movably supported on an angle member 63.

The recording head using ink jet nozzles is of the non-contact type and is very preferable for the high-speed recording.

Moreover, the circulatory moving path space is in its steady state in which it is hardly affected from outside by the suction and rotation of the support cylinder and therefore, it preferably permits the ink jets to be operated stably.

Instead of the recording head provided with ink jet nozzles, it is of course possible to use an electrostatic recording head or a thermosensitive head or the like. However, these heads are of the contact type and need counter-measures when high speed is desired.

A roller 64 disposed behind the recording head 59 serves to maintain reliable conveyance of the recording medium and by making the surface thereof hygroscopic, it is possible to expedite the drying of the ink on the recording medium if such ink is not dried.

After the recording has been terminated, the recording medium is separated from the support cylinder with the aid of the reduced suction force and of the movable casing block $C_6$, and is discharged outwardly of the circulatory moving path through the recording medium outlet port between the side casing block $C_5$ and the movable casing block $C_6$. The recording medium is then carried out of the machine by a conveyor belt 26 disposed adjacent to the outlet port and passed over and between a pair of rollers 65 and 65' (not shown).

In the construction of the present modified apparatus, when the discharge of the recording medium from the outlet port begins, a fresh recording medium can be supplied in subsequence to the trailing end of the discharged recording medium. That is, once the recording medium begins to move toward the outside along the upper surface of the movable casing block $C_6$, the separation of the recording medium from the support cylinder is not prevented due to the separating action of the movable casing block $C_6$ even if the suction force is increased. Since the suction force is now increased, the fresh recording medium can be sucked to the support cylinder surface.

Therefore, where it is desired to effect continuous recording on a number of recording mediums, the present modified apparatus can reduce the waiting time involved in the discharge and supply of the recording mediums and this is very preferable for high speed operation of the apparatus.

What we claimed is:

1. An image recording apparatus, comprising
   drum means for supporting a recording medium for cyclical movement to receive recording information, wherein said drum means is dimensioned to support the recording medium with its leading and trailing edges spaced from each other;
   recording means for recording the information on the recording medium;
   vacuum means for providing said drum means with a sucking force to hold the recording medium thereon;
   guiding means, disposed along and spaced from said drum means, for guiding the recording medium to the periphery of said drum means, said guiding means being provided with an opening for allowing the recording medium to enter into and to be removed from contact with said drum means;
   detecting means for detecting a position between the leading and trailing edges of the recording medium;
   separating means for releasing the sucking force after the detection by said detecting means, so that the leading edge of the recording medium faces said opening and said recording medium is passed through said opening in response to centrifugal force, thereby separating the medium from the drum means.

2. An apparatus according to claim 1, wherein said recording means includes ink jet image forming means.

3. An apparatus according to claim 1, wherein said separating means releases the sucking force before the leading edge of the recording medium faces said opening.

4. An apparatus according to claim 1, further comprising separation assisting means for guiding the recording medium away from said drum means after said separation thereof.

5. An apparatus according to claim 4, wherein said assisting means comprises a portion of said guiding means.

* * * * *

UNITED STATES PATENT AND TRADEMARK OFFICE
CERTIFICATE OF CORRECTION

PATENT NO. : 4,268,841

DATED : May 19, 1981

INVENTOR(S) : Motoharu Fujii, Noboru Koumura, Naoki Ayata, Yasushi Sato

It is certified that error appears in the above—identified patent and that said Letters Patent is hereby corrected as shown below:

Col. 6, line 9   "culinder" should be --cylinder--

Col. 7, line 52  "helt" should be --held--

Col. 8, line 26  "44" should be --41--

Col. 10, line 38 "of" should be --for--

Col. 11, line 3  "rollers" should be --plates--

Signed and Sealed this

Twenty-second Day of September 1981

[SEAL]

Attest:

Attesting Officer

GERALD J. MOSSINGHOFF

Commissioner of Patents and Trademarks